United States Patent

Paul et al.

[11] Patent Number: 6,126,247
[45] Date of Patent: Oct. 3, 2000

[54] COMPUTER CONTROL OF RAILROAD TRAIN BRAKE SYSTEM OPERATION

[75] Inventors: John E. Paul, Irwin; James E. Hart, Trafford, both of Pa.; Michael A. Colbert, Springfield, Va.

[73] Assignee: Westinghouse Air Brake Company, Wilmerding, Pa.

[21] Appl. No.: 09/038,175

[22] Filed: Mar. 10, 1998

[51] Int. Cl.[7] .............................. B60T 13/68; B60T 11/26
[52] U.S. Cl. .................................. 303/7; 303/3; 303/128; 303/20
[58] Field of Search .............................. 303/3, 7, 15, 20, 303/81, 86, 128, 132, 135; 246/187 C, 167 R, 182 B

[56] References Cited

U.S. PATENT DOCUMENTS

| | | | |
|---|---|---|---|
| 5,551,765 | 9/1996 | Sich | 303/7 |
| 5,681,015 | 10/1997 | Kull | 246/187 C |
| 5,833,325 | 11/1998 | Hart | 303/7 |
| 5,866,811 | 2/1999 | Skantar | 73/121 |
| 5,918,634 | 7/1999 | Hart et al. | 137/624.11 |
| 5,924,774 | 7/1999 | Cook et al. | 303/3 |

*Primary Examiner*—Chris Schwartz
*Attorney, Agent, or Firm*—James Ray & Associates

[57] ABSTRACT

Radio-based control of railroad train brakes is effected in which brake systems are computer controlled. An End of Train (EOT) system is used in which microprocessor circuits of a Locomotive Control Unit (LCU) and an EOT unit are programmed to perform these and other functions. The computer system has several states. On power on, the system enters the Setup state during which the system stores about one minutes worth of both brake pipe and equalizing reservoir pressure data. This data is later used to determine the rate of change of these pressures to determine stability. Once setup is complete, the system enters the Stability state during which operating pressures are determined. When the equalizing reservoir pressure, the brake pipe pressure and the brake pipe pressure at the end of the train are stable, the EOT unit is commanded to update operating pressures stored in its microprocessor control circuit. Once the several pressures have been found to be stable, the system goes to the Release state. The system makes transitions between the Release state and the Stability state until a predetermined decrease in brake pipe pressure is detected. At this point, the system makes a transition to the Application state. In this state, determinations are made as to whether to transmit brake commands to the EOT unit from the LCU or to return to one of the Stability or Release states. In any of these states, the system can immediately enter the Emergency state to the Setup state, if setup has not been completed, or to the Release state if setup has been completed.

32 Claims, 14 Drawing Sheets

COMPUTER CONTROL OF RAILROAD TRAIN BRAKE SYSTEM OPERATION

FIELD OF THE INVENTION

The present invention generally relates to implementing radio-based Electro-Pneumatic (EP) control of railroad train brakes and, more particularly, to computer control of railroad train brake systems including establishing operating pressures, generating and responding to brake commands, and monitoring and analyzing pressure gradients.

BACKGROUND OF THE INVENTION

Radio controlled remote brake systems for a railway train having a caboose equipped with a motor driven pressure regulating valve are known in the art. An example of one such system is disclosed in U.S. Pat. No. 4,056,286 to Burkett which is assigned to the assignee of the present application. In that system, when a brake application is made at the locomotive by operating the engineer's brake valve device, a radio signal corresponding to the brake valve position is transmitted to the caboose where it is compared with a feedback signal corresponding to the instantaneous position in which the caboose regulating valve is set by its drive motor. The comparison is done digitally in a digital servo mechanism to control a stepping motor that operates the valve.

End of Train (EOT) signaling and monitoring equipment is now widely used, in place of cabooses, to meet operating and safety requirements of railroads. The information monitored by the EOT unit typically includes the air pressure of the brake line, battery condition, warning light operation, and train movement. This information is transmitted to the crew in the locomotive by a battery powered telemetry transmitter.

The original EOT telemetry systems were one-way systems; that is, data was periodically transmitted from the EOT unit to the Locomotive Control Unit or LCU (sometimes called the Head of Train [HOT] unit) in the locomotive where the information was displayed. More recently, two-way systems have been introduced wherein transmissions are made by the LCU to the EOT unit. In one specific application, the EOT unit controls an emergency air valve in the brake line which can be controlled by a transmission from the LCU. In a one-way system, emergency application of the brakes starts at the locomotive and progresses along the brake pipe to the end of the train. This process can take significant time in a long train, and if there is a restriction in the brake pipe, the brakes beyond the restriction may not be actuated. With a two-way system, emergency braking can be initiated at the end of the train independently of the initiation of emergency braking at the head of the train, and the process or brake application can be considerably shortened, with assurance of applying brakes behind any such obstruction.

As will be appreciated by those skilled in the art, in order for a LCU to communicate emergency commands to an associated EOT unit, it is desirable for the LCU to be "armed"; that is, linked to a specific EOT unit by authorized railroad personnel. This is desirable to prevent one LCU from erroneously or maliciously actuating the emergency brakes in another train. To this end the LCU includes a nonvolatile memory in which a unique code identifying an EOT unit can be stored. The LCU also has a row of thumb wheel switches which allows manual entry of codes. Additional background on EOT systems may be had by reference to U.S. Pat. Nos. 5,374,015 and 5,377,938, both of Bezos et al. and assigned to the assignee of this application. The disclosures of these two references are incorporated herewith by reference.

For more effective operation of EOT systems, computer control strategy is needed that automatically establishes operating pressures at the LCU and EOT unit, generate brake commands at the LCU and the EOT units, respond to brake commands generated and transmitted by the LCU, and monitor and analyze a pressure gradient between the locomotive and rear of the train, among other things. It is desirable to perform these functions in an automated way so as to minimize the tasks of railroad personnel, especially the engineer, and at the same time provide the engineer with valuable information on the performance of the train's brake system.

SUMMARY OF THE INVENTION

It is therefore a primary objective of the present invention to provide computer control of railroad train brake systems including deducing operating pressures, generating and responding to both service and emergency brake commands, and monitoring and analyzing pressure gradient using radio transmissions between a Locomotive Control Unit [LCU] and an End of Train Unit [EOT].

Another objective of the invention is to interface a microprocessor providing the above functions with an equalizing reservoir and the brake pipe of the train using a System or Service Interface Unit (SIU) or other functionally similar equipment such as EPIC® brake control systems developed by Westinghouse Airbrake Company. Such a unit or equipment provides the microprocessor with pressure information, which information is also transmitted to a microprocessor located in the End of the Train Unit.

A further objective of the invention is to provide the above microprocessor with software that implements either a setup or pressure stability state before brake release and brake application states are reached.

Another objective of the invention is to provide the End of Train (EOT) Unit with a delta pressure braking function using the above Service Interface Unit.

Yet another objective of the invention is to provide an End of Train Unit with a program that self tests brake pipe conditions at the rear of a train. This can be initiated at the EOT unit itself or by the above Service Interface Unit.

Another objective of the invention is to synchronize the operation of the LCU and EOT units using a "time stamp" provided by the Service Interface Unit and sent to the LCU and EOT units.

According to the invention, there is provided an implementation of a radio-based Electro-Pneumatic (EP) control of railroad train brakes in which remote brake pipe pressure reductions are computer controlled. The preferred embodiment of the invention is implemented in an End of Train (EOT) system in which microprocessor control circuits of the Locomotive Control Unit (LCU) and the EOT unit are programmed to perform these and other functions.

The computer controlled system has several states, the method of the invention being implemented as a "state" machine or system. With the occurrence of power on, the machine or system enters the Setup state during which the system stores approximately one minute's worth of both brake pipe and equalizing reservoir pressure data. This data is later used to determine the rate of change of these pressures to determine pressure stability. Once setup is complete, the system enters the Stability state during which operating pressures are determined. When the equalizing reservoir pressure, the brake pipe pressure and the brake pipe pressure at the end of the train are stable, the EOT unit is commanded to update the operating pressures stored in its microprocessor control circuit. Once the several pressures have been found to be stable, the system goes to the Stability state or a Release state. The system makes transitions between the Release state and the Stability state until a predetermined decrease in brake pipe pressure is detected. At this point, the system makes a transition to the Application (service) state. In this state, determinations are made as to whether to transmit brake commands to the EOT unit or to return to one of the Stability or Release states. In any of these states, the system can immediately enter the Emergency state, even if operating pressures have not been established. Once an emergency condition ceases to exist, the system exits from the Emergency state to the Setup state, if setup has not been completed, or to the Release state if setup has been completed.

BRIEF DESCRIPTION OF THE DRAWINGS

The foregoing and other objects, aspects and advantages will be better understood from the following detailed description of a preferred embodiment of the invention with reference to accompanying drawings, in which.

DETAILED DESCRIPTION OF A PREFERRED EMBODIMENT OF THE INVENTION

Figure 1A:
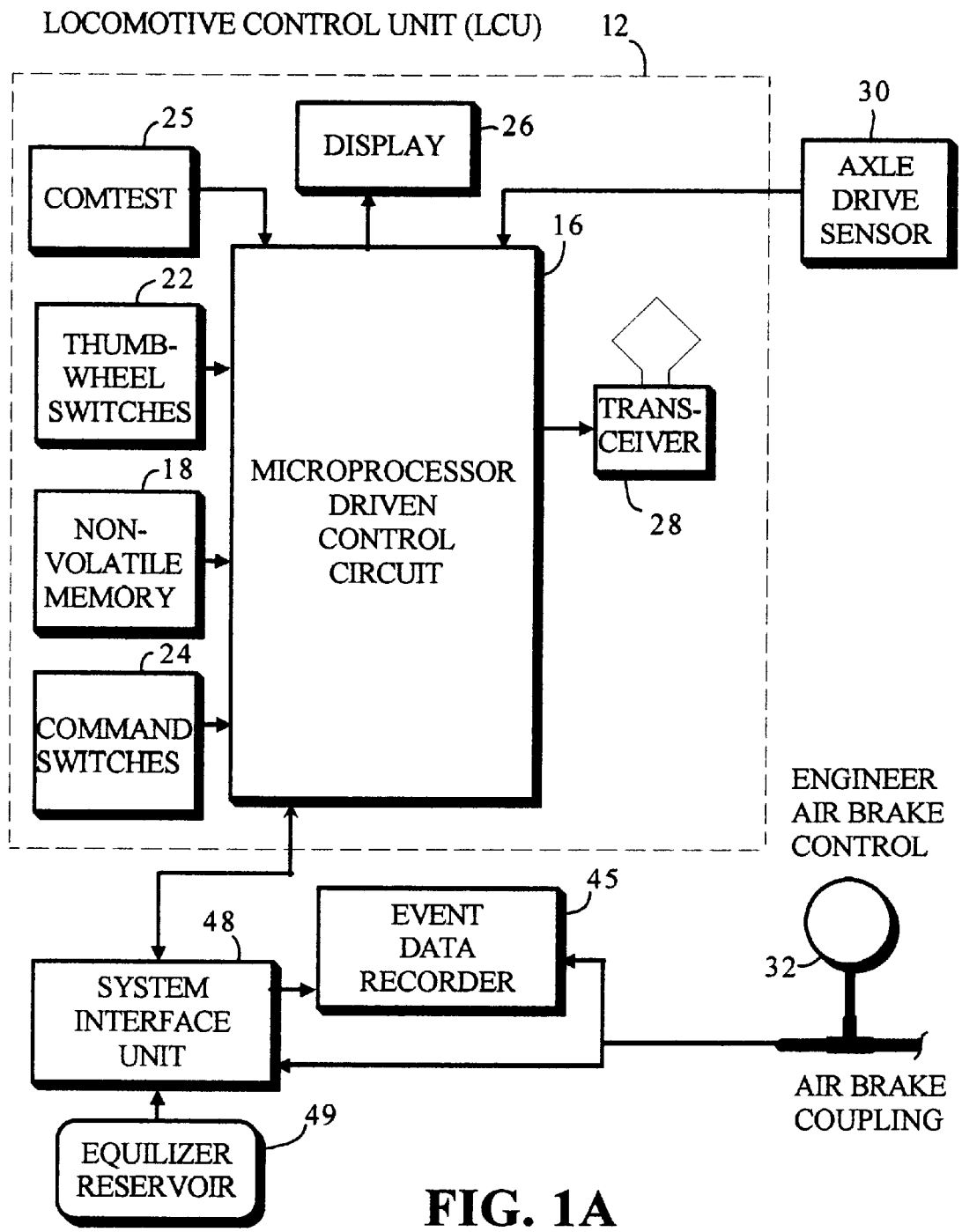
FIG. 1 is a block diagram showing the major component parts of an EOT unit and an LCU on which the subject invention may be implemented.
Figure 1B:
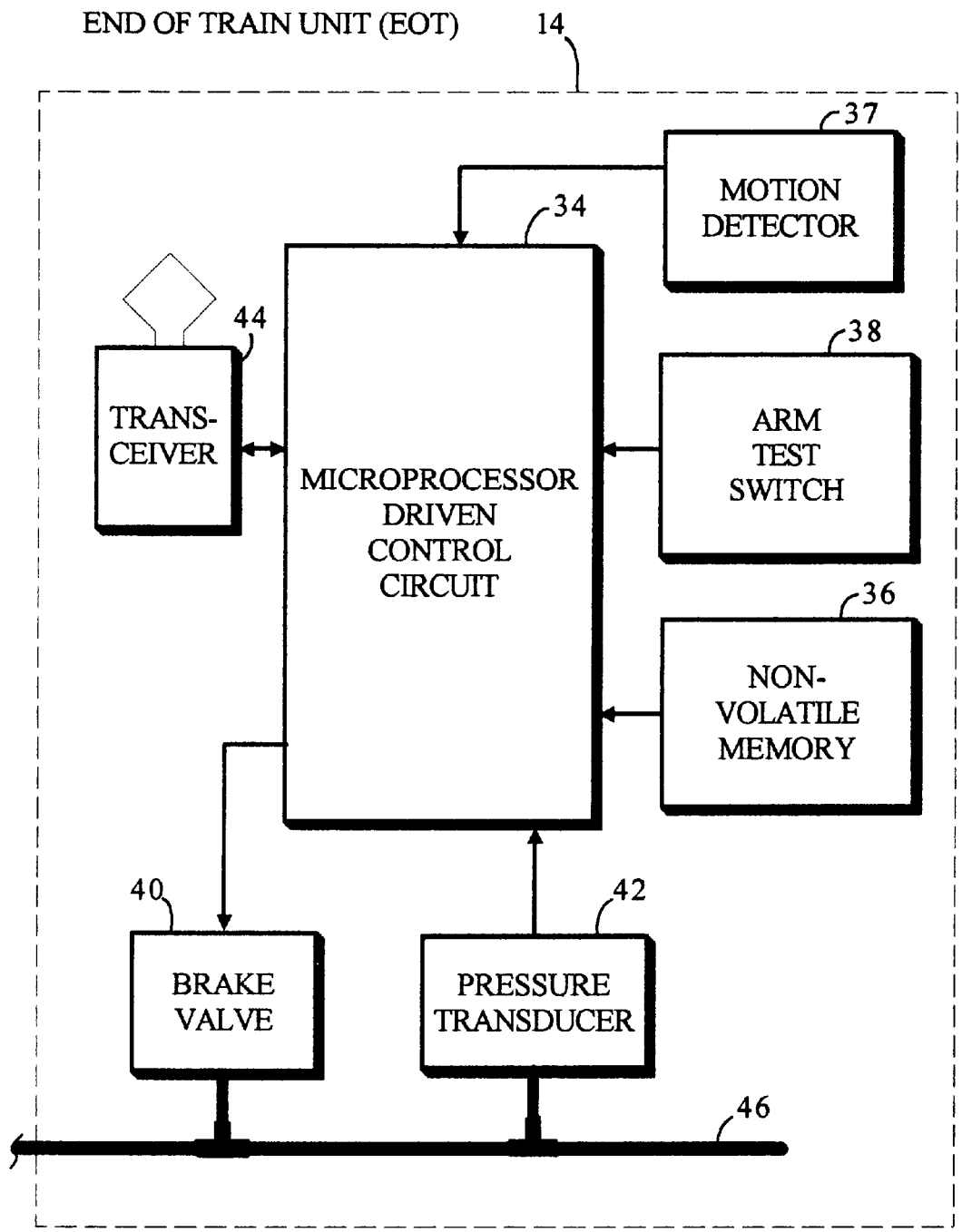

Referring now to the drawings, and more particularly to FIG. 1 thereof, there is shown a block diagram of a locomotive control unit (LCU) 12 and an end of train (EOT) unit 14 mechanically linked together by a train (not shown) and communicating by radio transmission. The EOT unit 14 is typically mounted on the trailing coupler (not shown) of the last car in the train and is equipped with pressure monitoring and telemetry circuitry. A hose (not shown) is connected between the train's brake pipe (46, discussed below) and the EOT unit so that the air pressure of the brake pipe at the end of the train can be monitored.

The LCU 12 includes a microprocessor control circuit 16, a nonvolatile memory 18, which stores the control program for the microprocessor control circuit, and a series of thumb wheel switches 22 through which an operator (e.g., the engineer) stationed at the LCU can manually enter the code number of the EOT unit 14, which code is unique. In addition to inputs from the thumb wheel switches and nonvolatile memory, the microprocessor control circuit 16 also has a command switch input 24 and a communication test (COMTEST) switch input 25 and provides outputs to a display 26 and to radio transceiver 28.

FIG. 1 shows the typical locomotive engineer locomotive air brake control at 32, and the normal air brake pipe 46 which extends the length of the train. Existing LCUs are connected to the locomotive's axle drive via an axle drive sensor 30 which provides typically twenty pulses per wheel revolution.

The EOT unit 14 includes a microprocessor control circuit 34, and a nonvolatile memory 36 in which the control program for the microprocessor control circuit and a unique identifier code of the particular EOT unit 14 are stored. The microprocessor control circuit 34 also has inputs from a motion detector 37, a manually activated arming and test switch 38, and a brake pressure responsive transducer 42. The microprocessor control circuit 34 generates an output to a brake valve 40 coupled to a brake pipe 46. The EOT unit 14 communicates with radio transceiver 28 of the LCU 12 by way of a radio transceiver 44 and associated antennae.

In addition, at the front of the train (e.g., the locomotive) there is typically an event data recorder 45 connected to the brake pipe 46 at the locomotive. The output of data recorder 45 is shown coupled to a System Interface Unit (SIU) 48 in FIG. 1 which Unit interfaces brake pressure values in pipe 46 with microprocessor control circuit 16 so that changes in pressure at the locomotive end of the brake pipe are coupled directly to the microprocessor control circuit 16. The System Interface Unit 48 is also connected a brake equalizer reservoir 49. The SIU provides electrical signal outputs proportional to sensed brake pipe pressure and equalizer reservoir pressure values directly to the microprocessor control circuit 16. Among other functions, the SIU 48 senses and communicates to LCU 12 the arrival of an emergency brake application. LCU 12 and SIU 48 function as a unit.

Computer Control Functions

The microprocessor control circuit 16 of the LCU/SIU 48 unit functions may be summarized as follows:

Monitor brake operating pressures and a fully charged brake pipe gradient,

Generate reservoir service and emergency brake application commands,

Determine brake pipe pressure stability in brake application,

Monitor pressure gradient in brake application, and

Perform false gradient analysis (a false gradient exists when air pressure in a brake pipe is changing; the change begins at the locomotive end of the train and proceeds to the EOT, the pressure being initially greater at the locomotive end than that at the remote end of the train.

Figure 2:
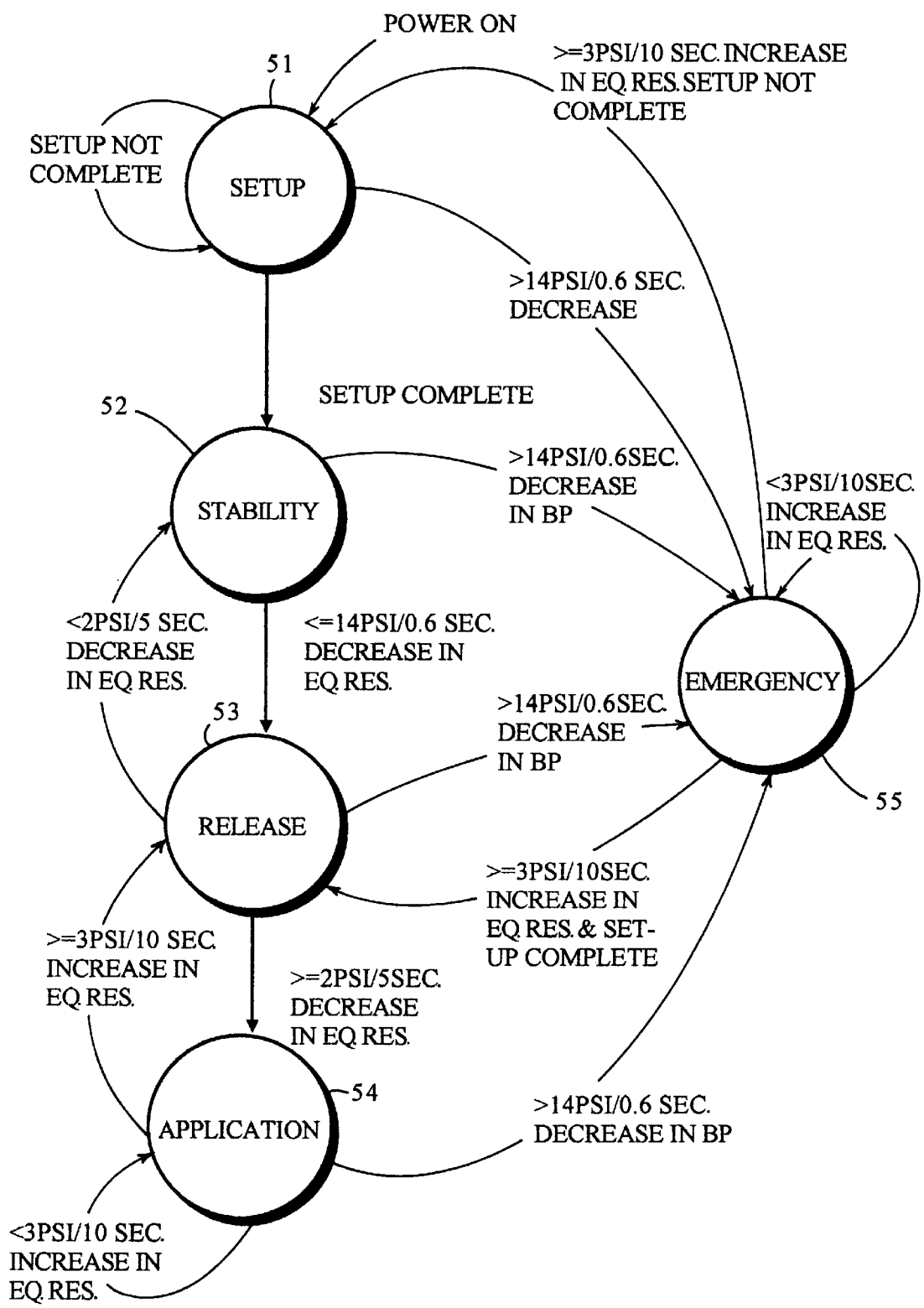
FIG. 2 is a state diagram showing the flow of the system functions according to the invention.

The EOT microprocessor control circuit 34 functions may be similarly summarized as follows:

Monitor operating pressure values,

Calculate brake pipe target ($BP_{13}$ tar) pressure value and control the brake pipe exhaust valve according to the brake pipe target pressure, Perform adaptive error adjustment,
Monitor gradient in application,
Perform stability volume leakage detection, and
Verify EOT operation Describing these functions in more detail, reference is now made to FIG. 2 of the drawings which shows a state diagram of system functions. The first state is the Setup procedure 51 the purpose of which is to allow the system to store approximately one minute's worth of data representing both brake pipe 46 and equalizing reservoir 49 pressures. This is needed to determine the rate of change of these pressures to determine stability. During this state, the system can respond to an emergency, however, because the time frame is only about 0.6 seconds to recognize an emergency.

Figure 3:
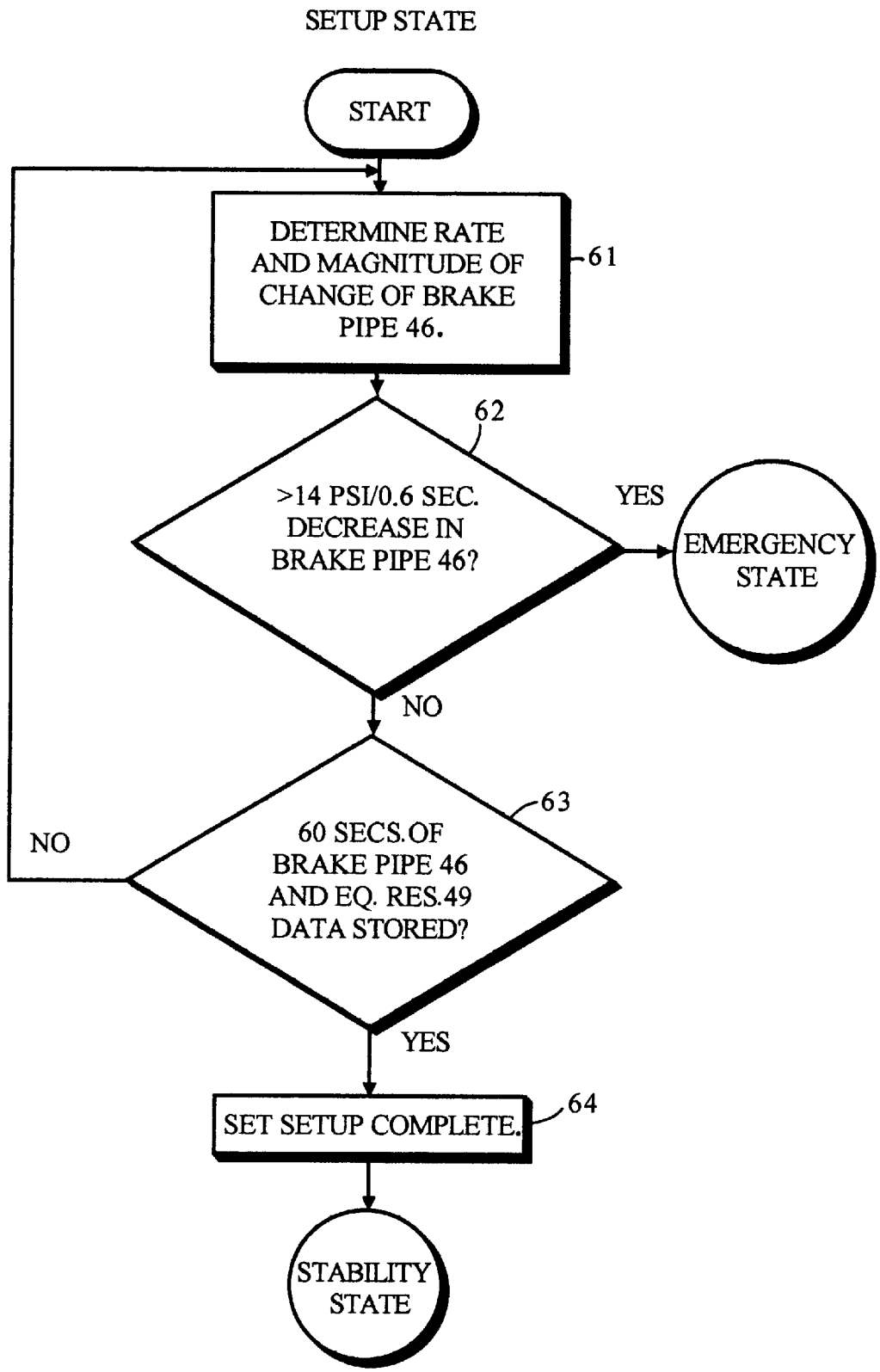
FIG. 3 is a flow diagram showing the logic of the Setup state function of FIG. 2.

The logic of the Setup state 51 is shown in the flow diagram of FIG. 3, to which reference is now made. A measurement is first made in function block 61 of the rate and magnitude of change of the pressure in brake pipe 46 by the control software in memory 18 of microprocessor 16. A test is made in decision block 62 to determine if the measured rate of change of brake pipe pressure is greater than say 14 pounds per square inch (psi) in 0.6 seconds. If so, the process of the microprocessor exits to an Emergency state 55 in FIG. 2. Otherwise, a test is made in decision block 63 to determine if approximately sixty seconds of brake pipe and equalization reservoir (EqRes) data have been stored in the microprocessor. If not, the process returns back to function block 61 to continue the measurement of data. When sixty seconds of brake pipe and equalization reservoir pressure data have been stored a Setup flag is set to "complete" in function block 64 by microprocessor 16, and the process exits to the Stability state 52 in FIG. 2.

The Stability state 52 monitors the stability of pressure signals. Pressure stability is established for brake pipe 46 if the following conditions are met: (1) the locomotive brake pipe signal (BP_loco) is stable when brake pipe pressure changes less than about 0.3 pounds per square inch per minute (psi/min), (2) an equalizing reservoir signal (Eq_Res) is stable when the pressure in equalizing reservoir 49 changes less than say 0.3 psi/min, and (3) the EOT brake pipe signal (BP_eot) is stable when the EOT brake pipe 46 pressure changes less than say 0.3 psi/three minutes.

Figure 4:
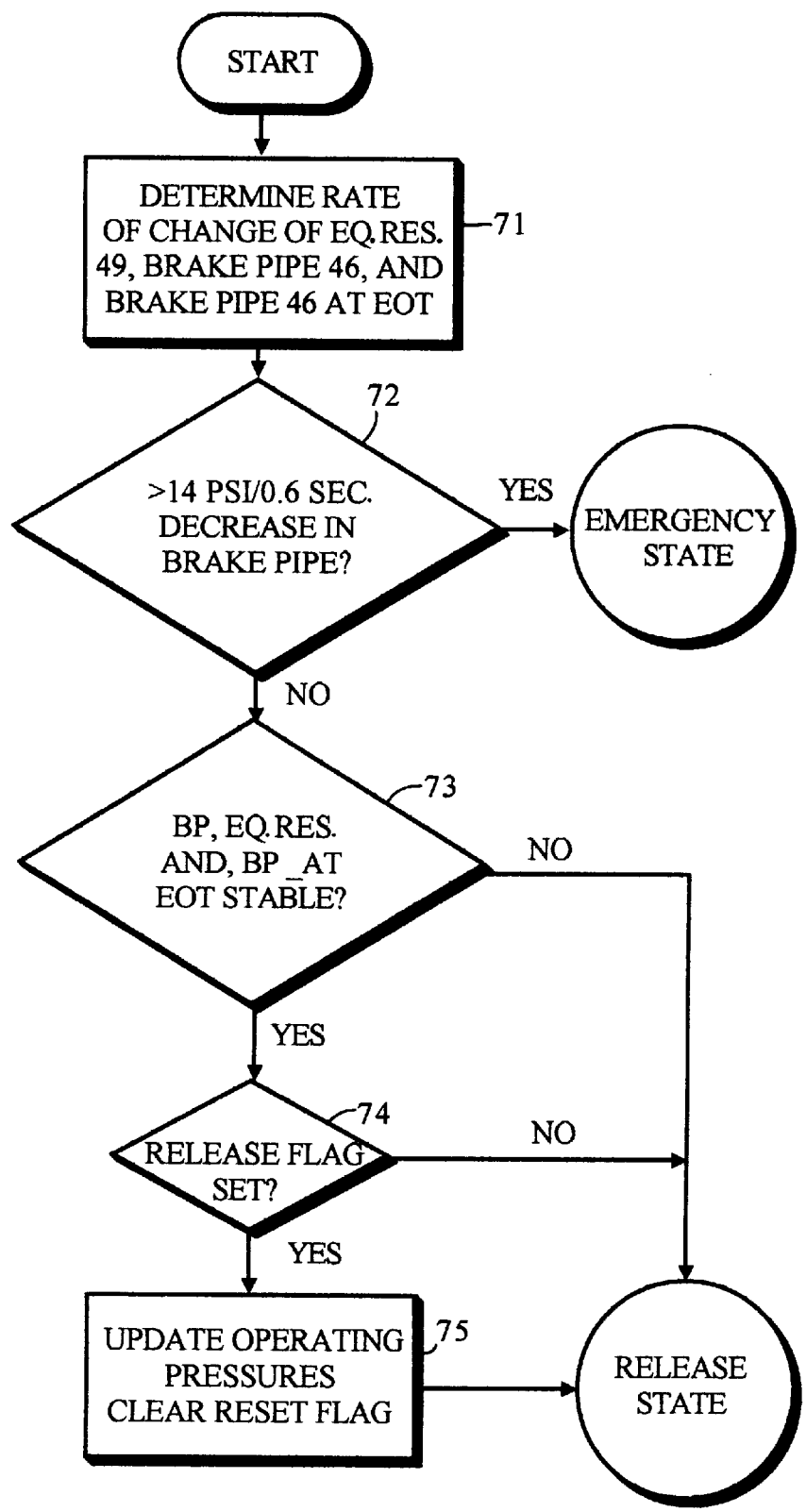
FIG. 4 is a flow diagram showing the logic of the Stability state function of FIG. 2.

Operating pressures are determined in the Stability state 52. The flow diagram for this state is shown in FIG. 4.

The process begins by SIU 48 measuring the rate of change of pressure at equalizing reservoir 49 (EqRes), brake pipe pressure at the locomotive end of the train, and brake pipe pressure at the EOT (via transducer 42 and microprocessor 34) in function block 71. A test is made in decision block 72 to determine if the measured rate of change of brake pipe pressure is greater than say 14 psi in 0.6 seconds. If so, the process exits to the Emergency state 55 in FIG. 2. Otherwise, the equalizing reservoir 49 is checked for pressure stability in decision block 73. If the change in reservoir pressure over one minute has been less than 0.3 psi, it is considered stable.

The same criterion is used in decision block 73 on brake pipe 46. Brake pipe pressure at the end of the train is also checked in decision block 73 using the pressure values measured at transducer 42 in unit 14.

The pipe pressure at the end of the train is transmitted to the microprocessor 16 in locomotive unit 12 from microprocessor 34 in unit 14 by transceiver's 44 and 30.

If one or more of the measured pressures is not stable according to the above criteria, the process of the program of microprocessor 16 exits directly to the Release state 53 in FIG. 2. If all three pressures are stable, a check is made in decision block 74 to determine if a Release flag is set by microprocessor 16. If not, the process exits directly to the Release state 53 in FIG. 2; otherwise an Update Operating Pressures command is transmitted to the EOT unit 14 as indicated in function block 75, and the reset flag is cleared by the program of microprocessor 16. The system then goes to the Release state 53 in FIG. 2.

Figure 5:
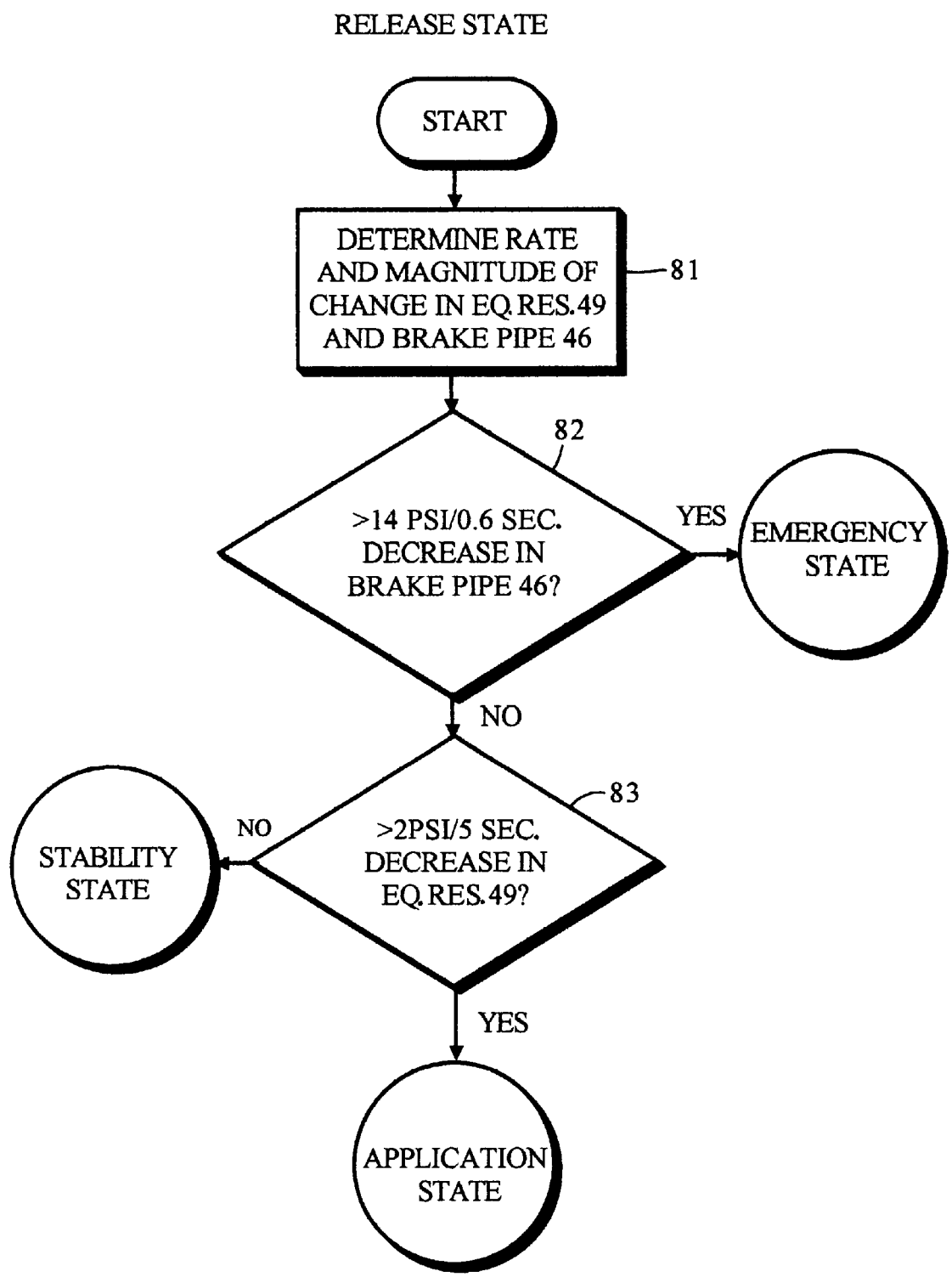
FIG. 5 is a flow diagram showing the logic of the Release state function of FIG. 2.

The flow diagram of the Release state is shown in FIG. 5. In this state, the process begins by again measuring pressure rate of change and pressure magnitude in equalizing reservoir 49 (Eq_Res) and brake pipe 46 as seen in function block 81. Again, a test is made in decision block 82 to determine if the measured rate of change of brake pipe pressure is greater than say 14 psi in 0.6 seconds. If so, the process exits to the Emergency state 55 in FIG. 2. Otherwise, the equalizing reservoir pressure is checked in decision block 83 to determine if there is a pressure decrease greater than say two psi in five seconds. If not, the process goes back to the Stability state 52 in FIG. 2. If so, the process goes to the application state 54 in FIG. 2, which is the state when brakes are in service.

Declaring that the system is stable at 52 is not the sole criterion for going to the Release state 53. If the system does not see an emergency (decision block 72), it goes to the Release state. The system makes transitions between the Stability and Release states until either of two conditions occur. Either an emergency is detected or a service application is detected. If brake application is seen with a decrease in pressure of about two psi in five seconds in the equalization reservoir (decision block 83 in FIG. 5), the system makes a transition to the Application state 54. In the event that an application is seen, the system first makes a transition to the Application state 54. It then continuously monitors for a release condition (increase of say three psi in ten seconds in equalization reservoir pressure). It also determines the depth (magnitude of the decrease) of the reduction in order to generate brake commands for transmission to the End of Train Unit 14 (FIG. 1).

The equalizing reservoir pressure signal (Eq_Res) is monitored at Release state 53 for application or release cycles. Whenever the brakes make a transition from the Application to Release states, the LCU 12 will transmit a release command to the EOT unit 14. If the EOT unit is venting the brake pipe at the time the "Brakes Release" command is received, it will cease venting of the brake pipe.

The LCU 14/SIU 48 combination in FIG. 1 establishes operating pressures by monitoring application and release cycles of the brakes. The equalizing reservoir pressure signal (Eq_Res) decreasing by say two psi within five seconds indicates that the brakes are applied, causing the system to go to Application state 54. The Eq_Res signal increasing by approximately three psi within ten seconds indicates brakes are released, causing the system to go back to Release state 53. When the brakes are released, the system goes back to Stability state 52 where a determination is made of brake pipe stability in release.

When the brakes are released and BP_loco, Eq_Res and BP_eot signals are stable in release, fully charged pressures (BP_op, Eq_Res_op, BP_eot_fc) are updated upon any of the pressures increasing by at least 0.5 psi or decreasing by at least 1 psi from its previous fully charged value. When the pressures are updated, the "Update Op Pres" command includes the values of BP_op and Eq_Res_op. Upon receipt of the "Update Op Pres" command from the LCU 12, the EOT unit 14 accepts the values BP_op and Eq_Res_op and generates BP_eot_fc_lcl, which is the current brake pipe pressure at the EOT unit.

When the brakes are released, the system goes to the Application (service) state 54 after certain criteria are met. This state is shown in expanded form in FIG. 6 of the drawings to which reference is now made. A Qualify Minimum Application state 91 is entered from Release state 53. When the system powers on, it cannot determine whether or not the brakes are applied or released. The system assumes the brakes to be released for purposes of establishing operating pressures. A "Min Appl" command for microprocessor 16 will cause the EOT unit 14 to make a reduction relative to the EOT brake pipe 46 pressure such that the system of the invention must now verify that the brakes are in fact in release before performing a minimum brake application (Min Appl). Thus, the LCU 12/SIU 48 generate minimum application and service brake commands only after the operating pressures have been established at the LCU/SIU and the EOT unit 14. Simultaneous minimum application and service brake commands can be issued only after the operating pressures have been established at the LCU/SIU and the EOT unit 14. A minimum application by the EOT unit will only be performed when brake pipe 46 is fully charged. The EOT unit 14 will not make a minimum application if the pneumatic reduction on pipe 46 has reached the EOT unit before the electronic brake command arrives via transceiver 44.

Figure 6:
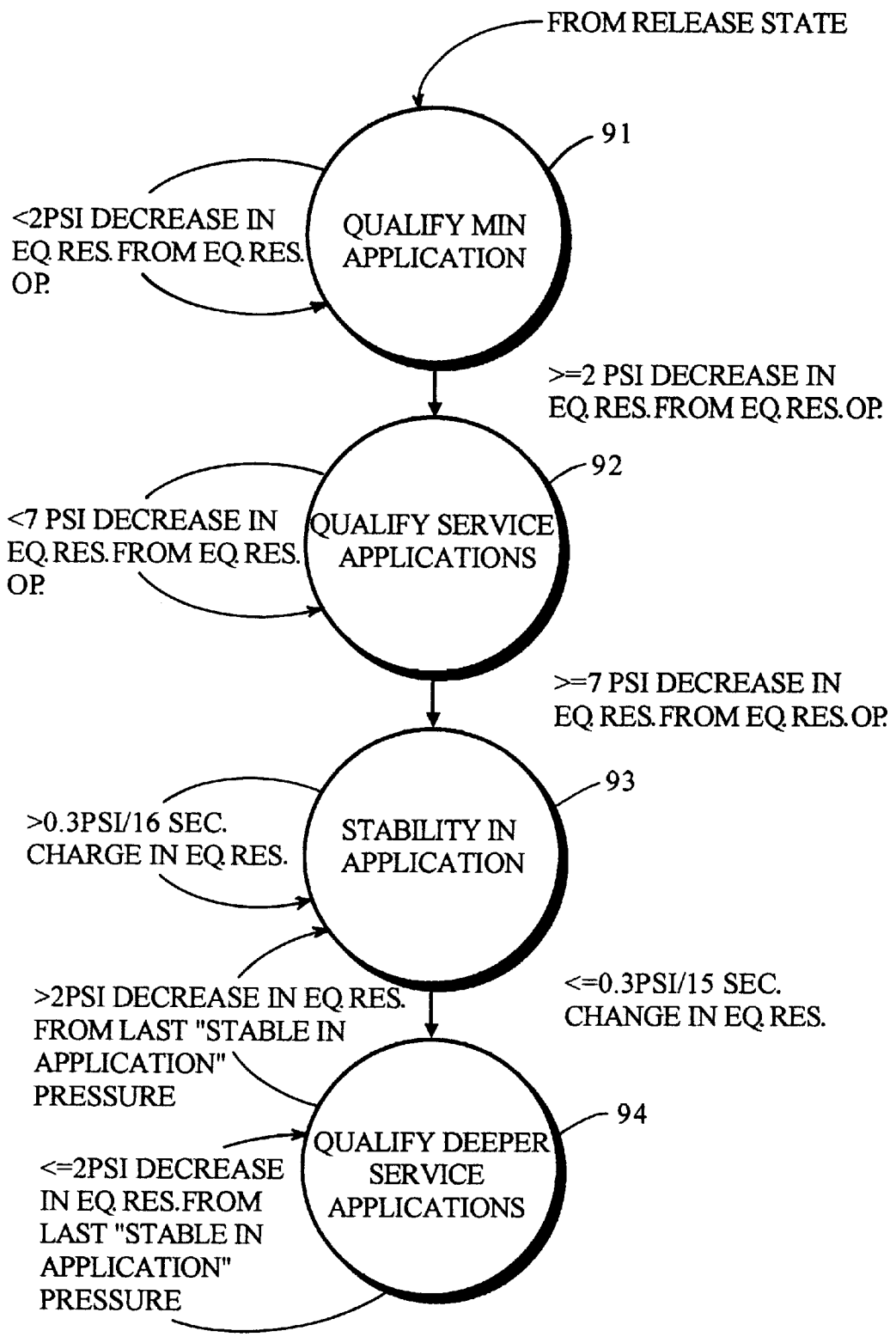
FIG. 6 is a state diagram showing an expansion of the Application function of FIG. 2.
Figure 7:
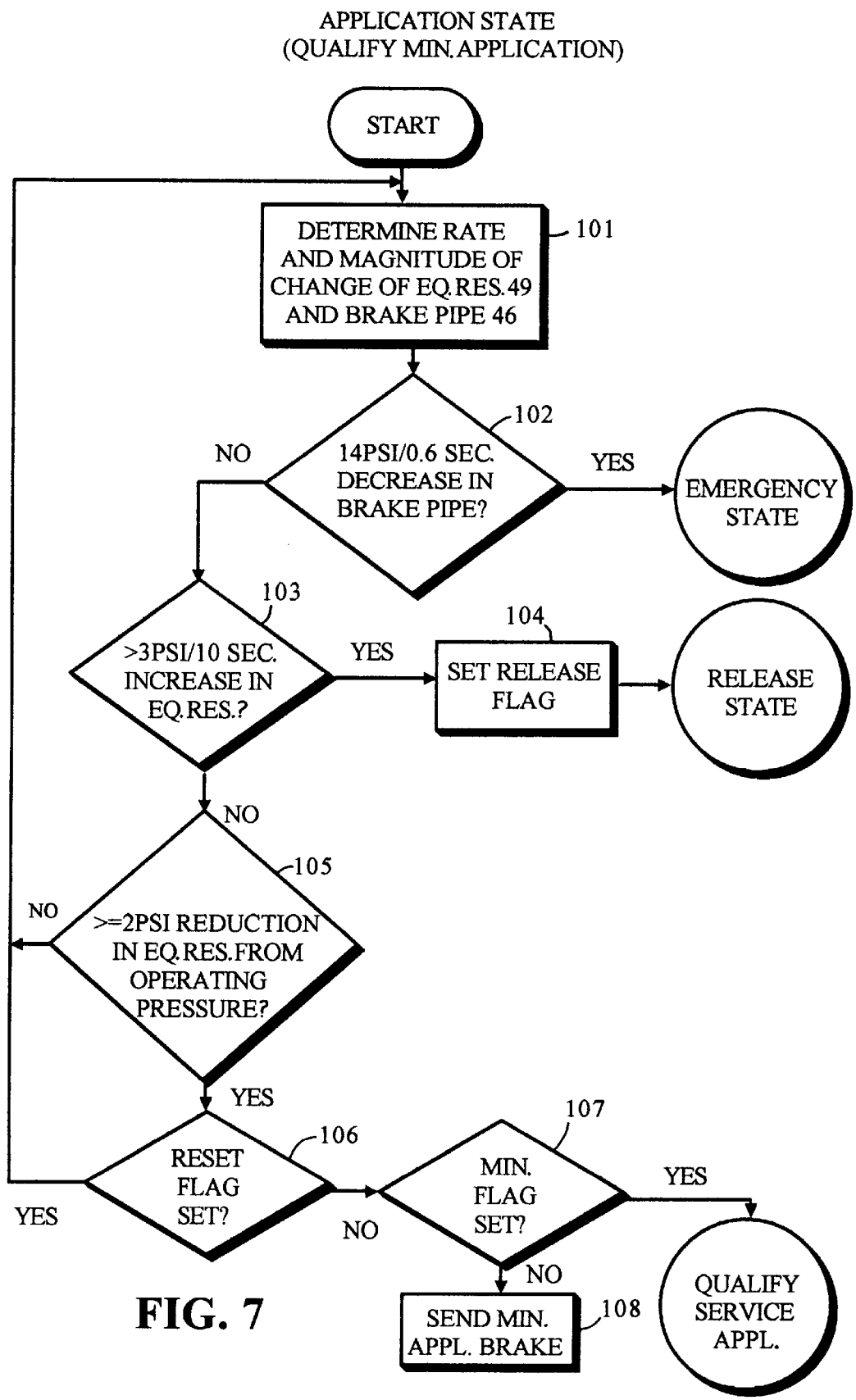
FIG. 7 is a flow diagram showing the logic of the Qualify minimum Application function of FIG. 6.

The logic of the Qualify Minimum Application state 91 is shown in the flow diagram of FIG. 7, to which reference is now made. A measurement is made of the rate and magnitude of change in equalization reservoir 49 (EqRes) and brake pipe 46 pressures in function block 101. A test is made in decision block 102 to determine if the measured rate of change of brake pipe pressure is greater than approximately 14 pounds per square inch (psi) in say 0.6 seconds. If so, the process exits to the Emergency state 55 in FIG. 2. Otherwise, the pressure in equalizing reservoir 49 is checked in decision block 103 to determine if the pressure has increased more than say three psi in ten seconds. If so, the release flag is set in function block 104, and the system goes to the Release state 53 in FIG. 2. If not, a further test is made in decision block 105 to determine if the Eq_Res signal has decreased by at least two psi below the value of Eq-Res-Op when the brakes are released. If not, the process loops back to function block 101 to continue the measurement of pressure change. If so, a check is made in decision block 106 to determine if the reset flag is set. If it is, the process loops back to function block 101; otherwise, a check is made in decision block 107 to determine if the minimum flag is set. If it is not set, the command "Min Application Brk" is transmitted to the EOT unit 14 by the LCU 12 in function block 108. If it is set, the process goes to "Quality service application" 92 (FIG. 6). If the "Min Application Brk" command (at 108) is sent from the LCU to the EOT unit 14, the EOT unit decreases brake pipe pressure according to a valve control algorithm located in memory 36. After the "Min Application Brk" command is sent or if the minimum flag is set, the Qualify Service Applications state 92 (FIG. 6) is entered, as seen FIG. 7.

Figure 8:
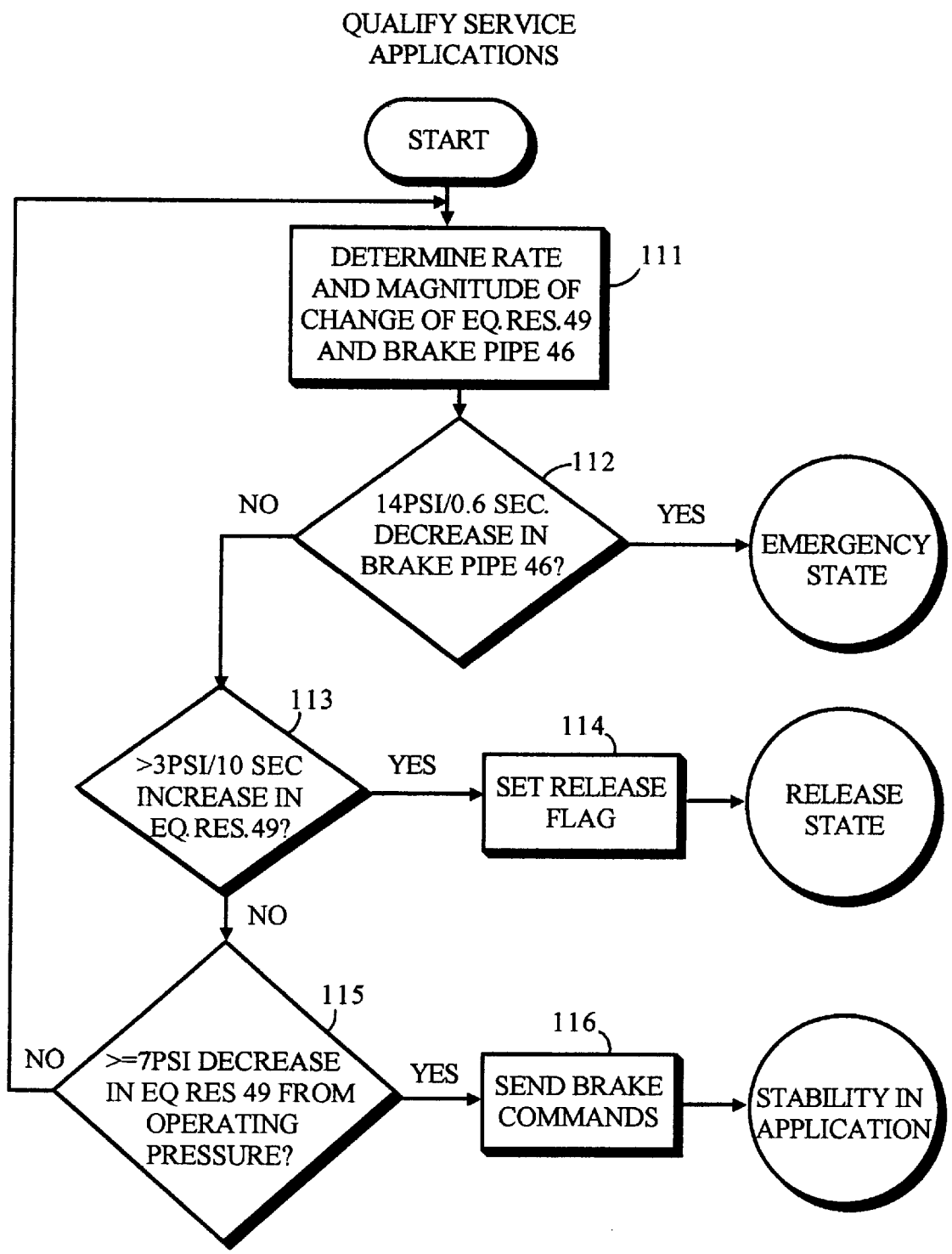
FIG. 8 is a flow diagram showing the logic of the Qualify Service Applications function of FIG. 6.

The flow diagram of the Qualify Service Applications state is shown in FIG. 8. The process measures the rate and magnitude of change of the equalization reservoir 49 and brake pipe 46 pressures in function block 111. A test is made in decision block 112 to determine if the measured rate of change of brake pipe pressure is greater than approximately 14 psi in 0.6 seconds. If so, the process exits to the Emergency state 55 in FIG. 2. Otherwise, the equalizing reservoir pressure is checked in decision block 113. If an increase in pressure is greater than say 3 psi in ten seconds, the release flag is set in function block 114, and the system reverts to the Release state 53 in FIG. 2. Otherwise, the equalizing reservoir pressure is checked in decision block 115 to determine if there has been a decrease in pressure of at least 7 psi from the operating pressure. If so, brake commands are sent to the EOT 14 in function block 116, and the system goes to the Stability in Application state 93 in FIG. 6. Otherwise, the process loops back to function block 111 to continue measuring rate and magnitude of pressure changes in equalization reservoir 49 and brake pipe 46.

Figure 9:
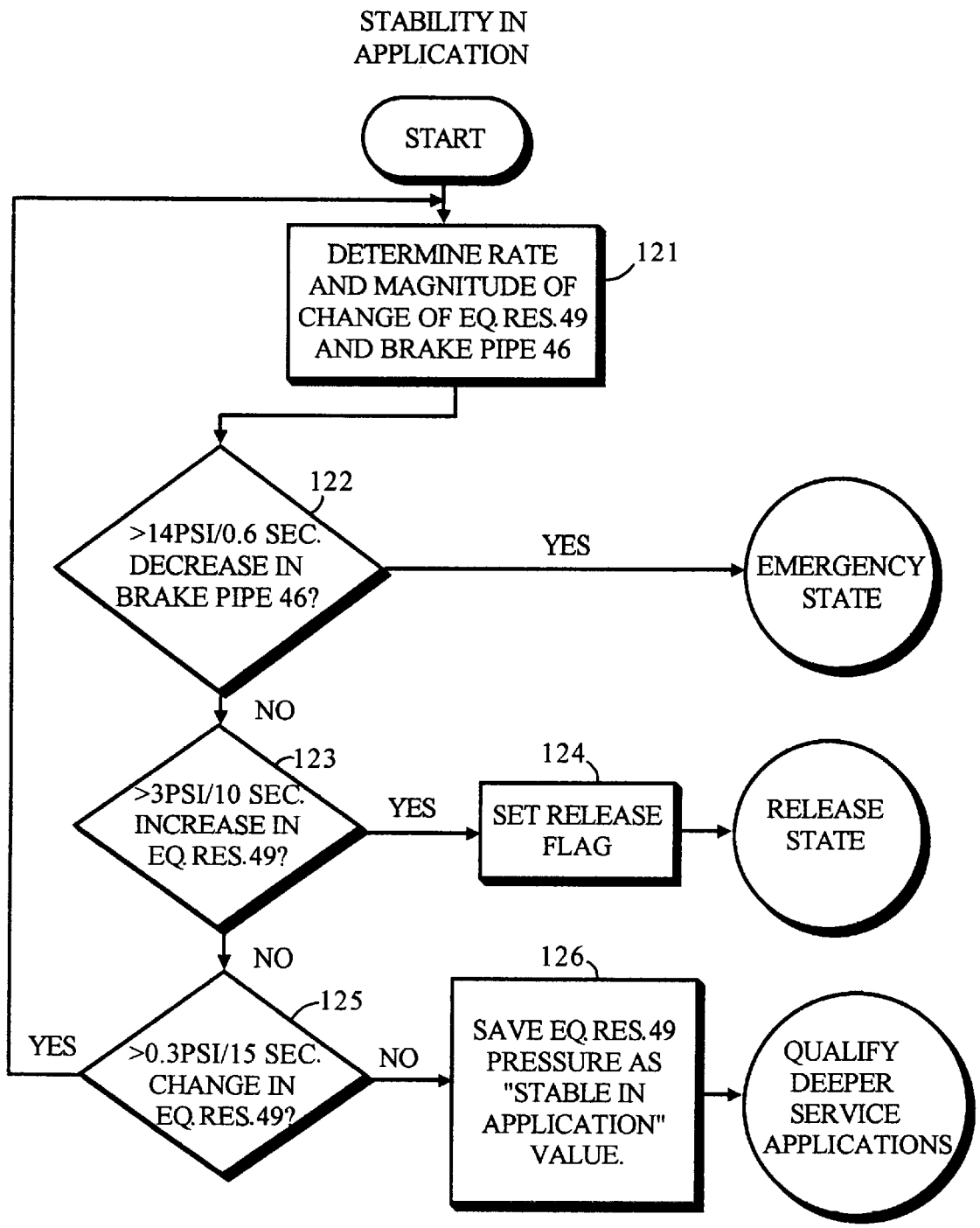
FIG. 9 is a flow diagram showing the logic of the Stability in Application function of FIG. 6.

The stability in application procedure 93 in FIG. 6 is entered upon the signal Eq_Res decreasing at least say 7 psi below the value of Eq_Res_op when the brakes are applied. In response, the LCU 12/SIU 48 generate a "Service Brk" command. This command includes the current pressure in equalization reservoir 49. The "Service Brk" command is transmitted every two seconds while the Eq_Res signal is decreasing until it stabilizes. The procedure is shown in FIG. 9, to which reference is now made.

The rate and magnitude of change in equalization reservoir 49 and brake pipe 46 pressures are measured in function block 121. A test is made in decision block 122 to determine if the measured rate of change of brake pipe pressure is greater than approximately 14 psi in 0.6 seconds. If so, the process exits to the Emergency state 55 in FIG. 2. Otherwise, equalizing reservoir pressure is checked in decision block 125. The Eq_Res signal is declared stable in application in function block 126 when it decreases less than say 0.3 psi in fifteen seconds and there is an increase in pressure of no more than say 0.3 psi in fifteen seconds. At this point, the system goes to the Qualify Deeper Service Application state 94 in FIG. 6.

Figure 10:
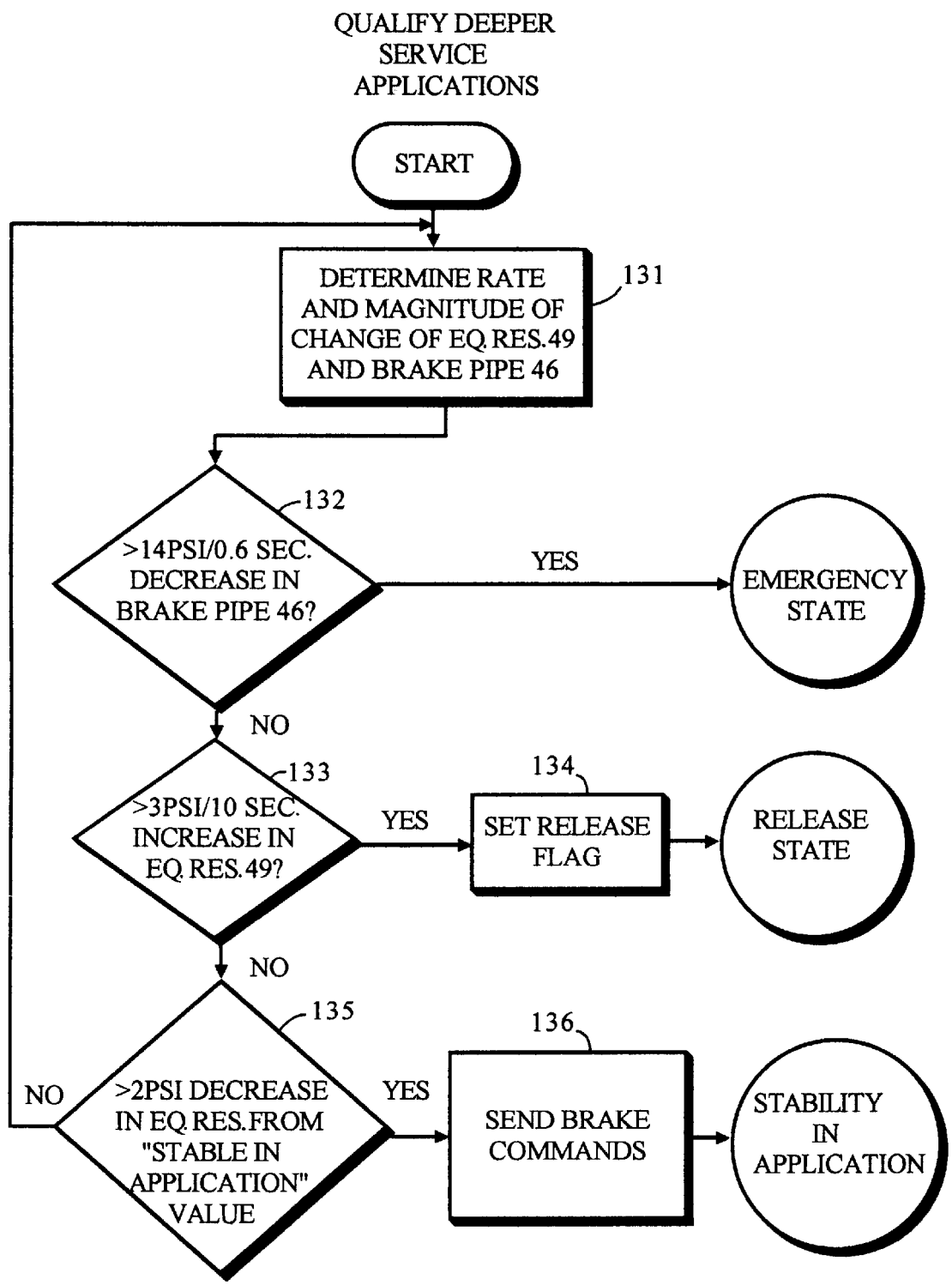
FIG. 10 is a flow diagram showing the logic of the Qualify Deeper Service Applications function of FIG. 6.

The Qualify Deeper Service Application state is illustrated in the flow diagram of FIG. 10. The rate and magnitude of change in the equalization reservoir and brake pipe pressures are measured in function block 131. A test is made in decision block 132 to determine if the measured rate of change of brake pipe pressure is greater than approximately 14 psi in 0.6 seconds. If so, the process exits to the Emergency state 55 in FIG. 2. Otherwise, the equalizing reservoir pressure is checked in decision block 133. If the change in pressure is greater than say three psi in ten seconds, the release flag is set in function box 134, and the system reverts to the Release state 53 in FIG. 2. Otherwise, the equalizing reservoir pressure is checked in decision block 135. If a greater than approximately two psi decrease in pressure in equalization reservoir 49 from the "stable in application" value is detected, brake commands are transmitted to the EOT 14 in function block 136, and the system reverts to the Stability in Application state 93 shown in FIG. 6; otherwise, the process loops back to function block 131 to continue measurement of rate and magnitude of pressure changes in equalization reservoir 49 and brake pipe 46.

Upon receiving a "Service Brk" command from the LCU 12, the microprocessor 34 of EOT unit 14 calculates the target brake pipe reduction using an error valve in the accuracy of transducer 42 and the current pressure valve contained in the service brake command. Microprocessor 34 then orders the venting of brake pipe 46 to the target brake pipe reduction.

Upon equalizing reservoir 49 indicating a change in the brake state from applied to released, the "Brakes Released" command is transmitted to the EOT unit 14 by microprocessor 16. When the "Brakes Released" command is received by the EOT unit 14, the EOT unit ends control of the brake pipe by going to the "release" state of the valve control effected at 40 (FIG. 1).

Delta Equalizing Reservoir Braking

A delta or minimum equalizing reservoir braking function (del_Eq_Res) permits EOT unit 14 to become effective for small incremental reductions in brake pipe pressure. The EOT unit makes a proportional decrease in brake pipe pressure corresponding to the decrease in equalizing reservoir 49 pressure at the locomotive end as sensed by SIU 48. There are, however, two scenarios in which the del_Eq_Res braking function must be avoided. The first is when a false gradient exists in the train. The second is if the electronic brake command from transceiver 28 is delayed such that the locomotive controlled pneumatic reduction influences brake pipe 46 pressure at the EOT unit 14 before the electronic command is received via transceiver 44.

There is then the possibility of the pneumatic brake command propagating to the EOT unit 14 before the electronic brake command is received by unit 14. When the EOT unit 14 is making a reduction relative to its own brake pipe pressure (minimum application or delta equalizing reservoir braking), as sensed by transducer 42, it must use its brake pipe pressure at the time the electronic command was generated at the LCU 12. Therefore, the LCU 12 and the EOT unit 14 must be time synchronized. To accomplish this, electronic brake commands are time stamped or tagged. Accurate low drift timers in the SIU 48 and in the microprocessor 34 of EOT unit 14 can be used to provide time stamp commands.

The SIU 48 synchronizes the EOT unit 14 via the LCU 12 upon updating operating pressures, and it resynchronizes the EOT unit if the time stamps differ substantially. The SIU is responsible for maintaining synchronization. The command to "synchronize" is, however, transmitted by the LCU 12 from transceiver 28 to transceiver 44 at the EOT unit 14. The "Sync" command includes the SIU time stamp which can be 0 to 60 seconds. Upon receipt of the "Sync" command, the EOT unit 14 synchronizes itself to the SIU supplied time stamp.

A simultaneous minimum brake application provided by EOT unit 14 is only performed when brake pipe 46 is fully charged. The EOT unit 14 responds to the "Min Appl Brk" command from LCU 12 by making a relative reduction in brake pipe pressure. The EOT unit 14 is programmed to refuse a minimum brake application command if pneumatic reduction has reached the EOT unit 14 via brake pipe 46 before the electronic brake command from transceiver 28.

An Eq_Res signal indicates a change in the brake state from released to applied. Upon the occurrence of this change the value of the false gradient that occurs at the initiation of this application is saved.

Upon Eq_Res indicating a change in the brake state from applied to released, a brake application number is generated and incremented in memory 18 of microprocessor 16, a sub-application number is generated and reset in memory 18, and a Eq_Res_blw_FG flag is cleared in microprocessor 16. The "Min Application Brk" command is generated and transmitted to EOT unit 14 if all of the following conditions are true:

Brakes are applied,
FG_init_appl<2 psi and BP_eot is stable,
"Min Application Brk" command has not yet been generated for this application, and
(Eq_Res_op-7)<Eq_Res_t≦(Eq_res_op-2)

The "Min Application Brk" command contains the time the command was generated and the brake application number provided by memory 18.

Upon reception of the "Min Application Brk" command, microprocessor 34 of EOT unit 14 determines if a "Min Application Brk" command has already been received. If so, EOT unit 14 will not perform the minimum brake application command. Otherwise, EOT unit 14 looks up the value of BP_eot at the time "Min Application Brk" command was generated. If the current BP_eot value is greater than or equal to approximately four psi below the BP-eot value at the time the "Min Application Brk" command was generated, then the EOT will not make the minimum brake application; otherwise the EOT application is performed according to the above calculated target brake pipe reduction using a transducer 42 error value and the current pressure value in the min appl. brk. command.

Service Brake Commands

The LCU 12/SIU 48 indicates a service brake reduction to the EOT unit 14 by transmitting either the gauge pressure of equalization reservoir 49 or a change in equalization reservoir pressure. The equalization reservoir gage pressure provides an unambiguous indication of where the pressure of brake pipe 46 at the EOT is going to end up, but it is not suitable for small incremental reductions. A change in equalization reservoir pressure is efficient for small incremental reductions but requires that there be no false gradient.

Service brake commands utilizing pressure values in equalizing reservoir 49 are used until equalization reservoir pressure reduction has stabilized at a level greater than or equal to that of a false gradient. After this point, changing (delta) equalizing reservoir pressure values are transmitted to the EOT unit 14 from LCU 12.

The "Service Brk/del_Eq_Res" command is transmitted to the EOT unit 14 if the Eq_Res_blw_FG flag is set in microprocessor 16 and when the following conditions are true:

Brakes are applied,
Eq_Res is not stable in application,
An approximately two second time interval has expired, and
Eq_RES_cur≦(Eq_Res_op-7).

The value of del_Eq_Res is (Eq_Res_stbl_pres-Eq_Res_cur). If the Eq_Res_blw_FG flag is not set and the above four conditions are true, then the "Service Brk/Eq_Res_cur" command is sent to the EOT unit 14 from LCU 12 via transceivers 28 and 44.

The EOT unit 14 upon receipt of the "Service Brk/Eq_Res_cur" command from the LCU 12 calculates the target brake pipe reduction using a maximum error value in the accuracy of transducer 42 and the pressure value contained in the service brake command, and vents the brake pipe to the BP_tar using brake valve 40.

Upon receipt of the "Service Brk/del_Eq_Res" command with a new sub-application number, microprocessor 34 of EOT unit 14 looks up values of BP_eot, BP_tar and whether or not the EOT unit was in control of brake pipe 46 when this brake command was generated. If the EOT unit was controlling the brake pipe at the time the command was generated by the microprocessor the variable BP_eot_sel is set equal to the BP_tar at the time the command was generated. If the EOT unit was not controlling the brake pipe when the command was generated, the variable BP_eot_sel is set equal to BP_eot by microprocessor 34 at the time the command was generated by microprocessor 16.

Upon updating BP_eot_sel, microprocessor 34 calculates BP_tar using again transducer 42 error and the pressure valve in the service brake command, and controls brake pipe pressure accordingly.

Monitoring Gradient

In the event a brake application is held in place for a period of time, such as descending a long grade, the system monitors the EOT brake pipe pressure for an increase in the fully charged pressure due to decreased leakage. While the brakes are applied, the Eq_Res, BP_loco and BP_eot signals are monitored. If all three of the pressures change less than say 0.3 psi over a ten second period, the current pressures are saved in memories 18 and 36 as the stable pressures for gradient monitoring (Eq_Res_grad_mon, BP_grad_mon, and BP_eot_grad_mon, respectively) and the "Get stable pressure for gradient monitor" command is transmitted to the EOT unit 14. The value BP_eot_fc is saved as BP_eot_fc_rel in memory 18 of microprocessor 16. The LCU 12/SIU 48 then enables monitoring of the gradient during brake application.

While the gradient in application is monitored, the signals BP_loco and Eq_Res are monitored by microprocessor 16 to ensure they are within about ±0.3 psi of their stable pressures for gradient monitoring. If they are stable, the current EOT brake pipe pressure (BP_eot) is compared to the BP_eot stable pressure for gradient monitoring by the microprocessors. If this difference is greater than or equal to say one psi, the "Adjust BP_eot_fc for decreasing gradient" command is transmitted from LCU 12 to EOT unit 14, and the local value of BP_eot_fc is adjusted and repeated using the difference between BP_eot_cur and BP_eot stable pressure in application if increasing by at least one psi.

If the gradient in application is being monitored and either BP_loco or Eq_Res is not within say ±0.3 psi of their stable pressures for gradient monitoring, the gradient monitoring, the gradient monitor is disabled by microprocessor 16.

Upon receipt of the "Get stable pressure for gradient monitor" command, the microprocessor 34 of the EOT unit 14 saves the current value of BP_eot as BP_eot_grad_mon. In addition, BP_eot_fc is saved as BP_eot_fc_rel. Upon receipt of the "Adjust BP_eot_fc for decreasing gradient" command, microprocessor 34 of the EOT unit 14 recalculates BP_eot_fc using the relationship of BP_eot_cur and BP_eot stable pressure.

Emergency Braking

Returning to FIG. 2, the emergency brake command is transmitted with or without operating pressure information being established. Upon brake pipe pressure at the locomotive end decreasing say at least 14 psi within 0.6 seconds, the LCU 12/SIU 48 transmit an "Emergency Brk" command to the EOT unit 14, and the emergency procedure 55 (FIG. 2) is entered. Once the "Emergency Brk" command is generated for a particular application, generation of the "Service Brk" commands are disabled by microprocessor 16 until a release is detected by the signal Eq_Res increasing approximately three psi within ten seconds. Upon receipt of the "Emergency Brk" command, microprocessor 34 of the EOT unit 14 vents the brake pipe locally.

Figure 11:
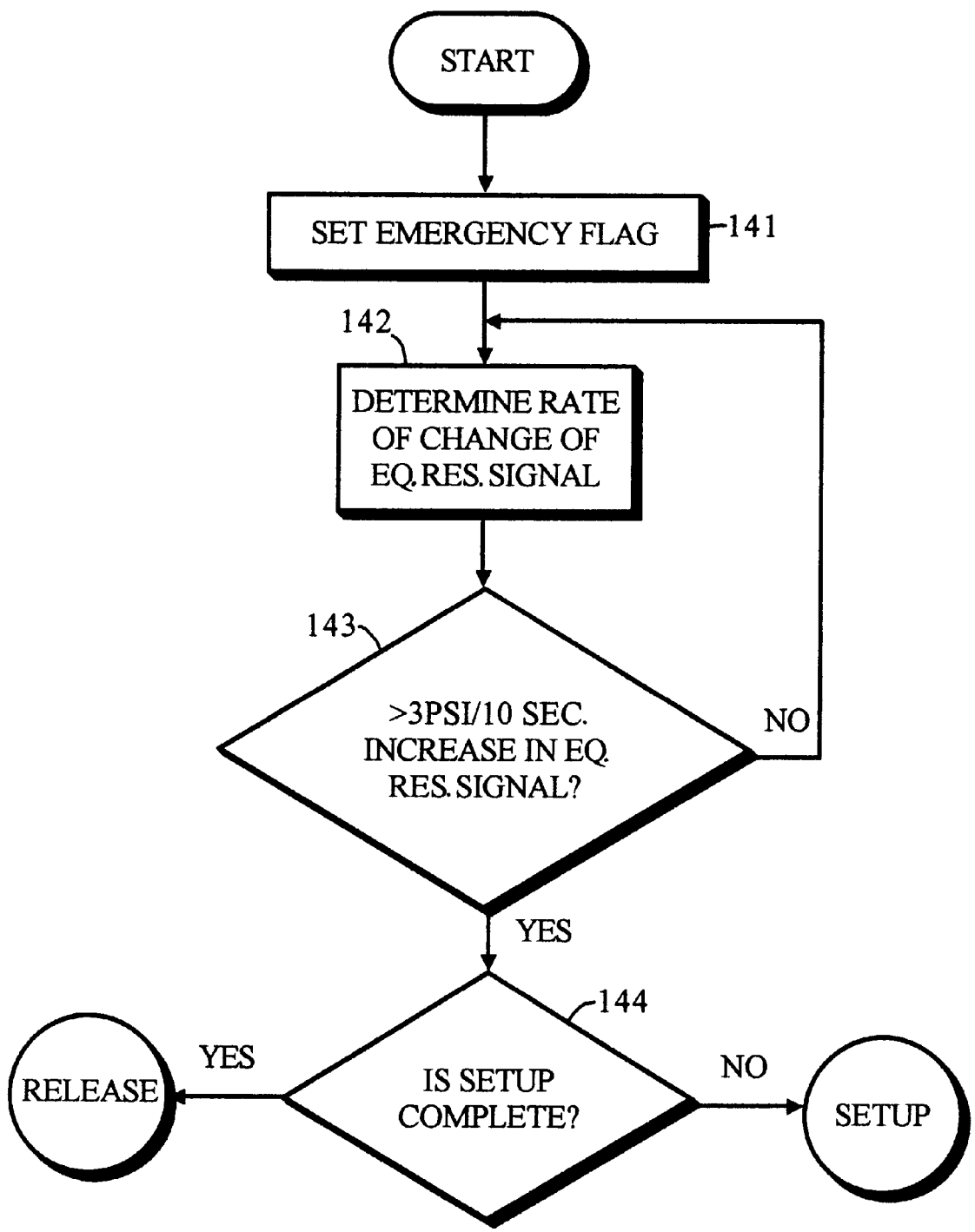
FIG. 11 is a flow diagram showing the logic of the Emergency State function of FIG. 2.

The Emergency state logic of the invention is shown in FIG. 11. Upon entering the Emergency state, the system sets an emergency flag in function block 141. The rate of change in pressure in of the equalization reservoir 49 is measured in function block 142. If the rate of change measured at 142 is not less than three psi in approximately ten seconds, the process returns to 142 for another measurement. If it is less than three psi in ten seconds, the program moves to decision block 144 to determine if the setup process 51 in FIG. 2 is complete. If not, the process exits to Setup process 51. If so, the process exits to the Release state 53 in FIG. 2.

Eot Unit Pneumatic Self-Test

Figure 12A:
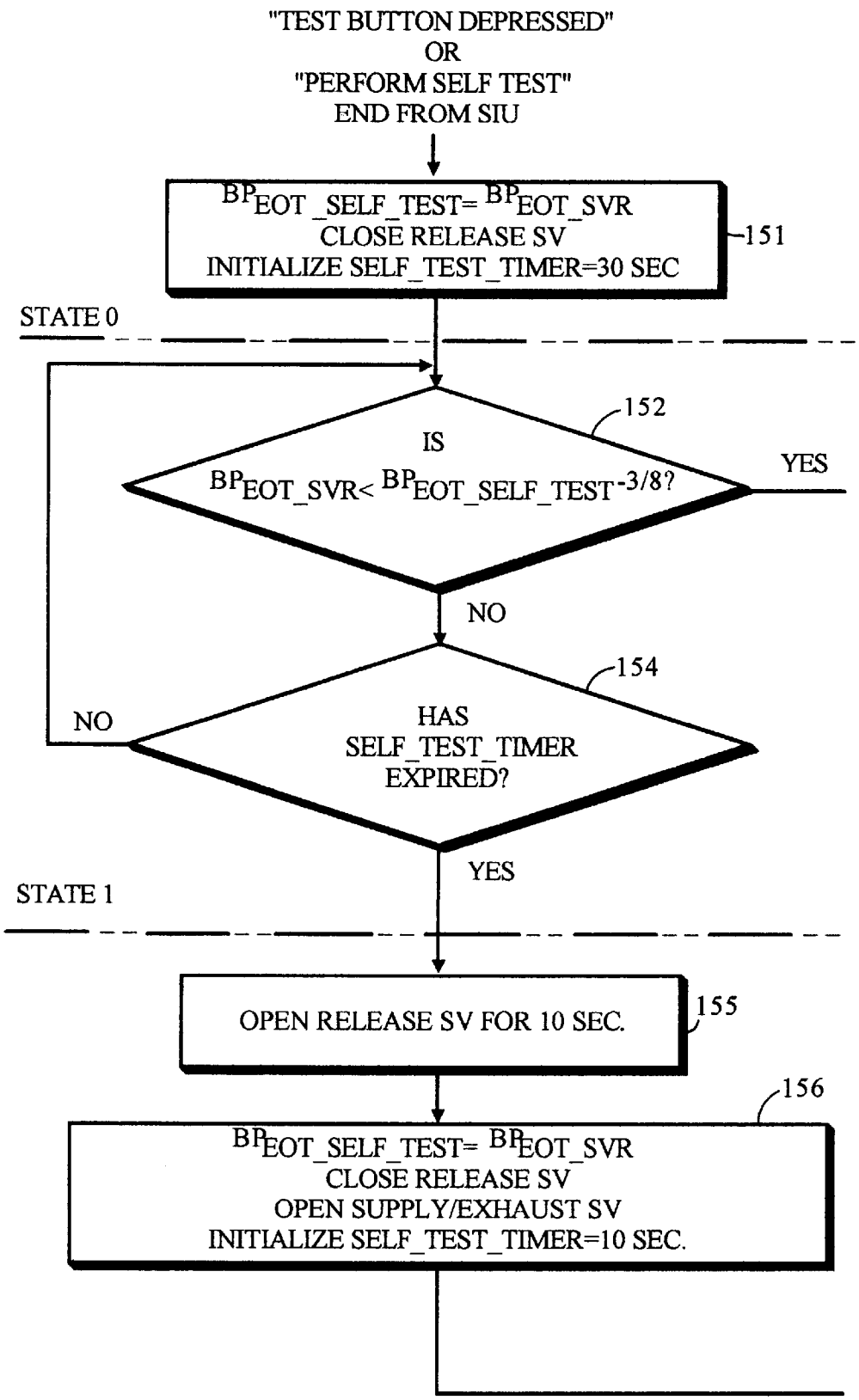
FIG. 12 is a flow diagram of the EOT pneumatic self-test software implemented on the EOT unit.
Figure 12B:
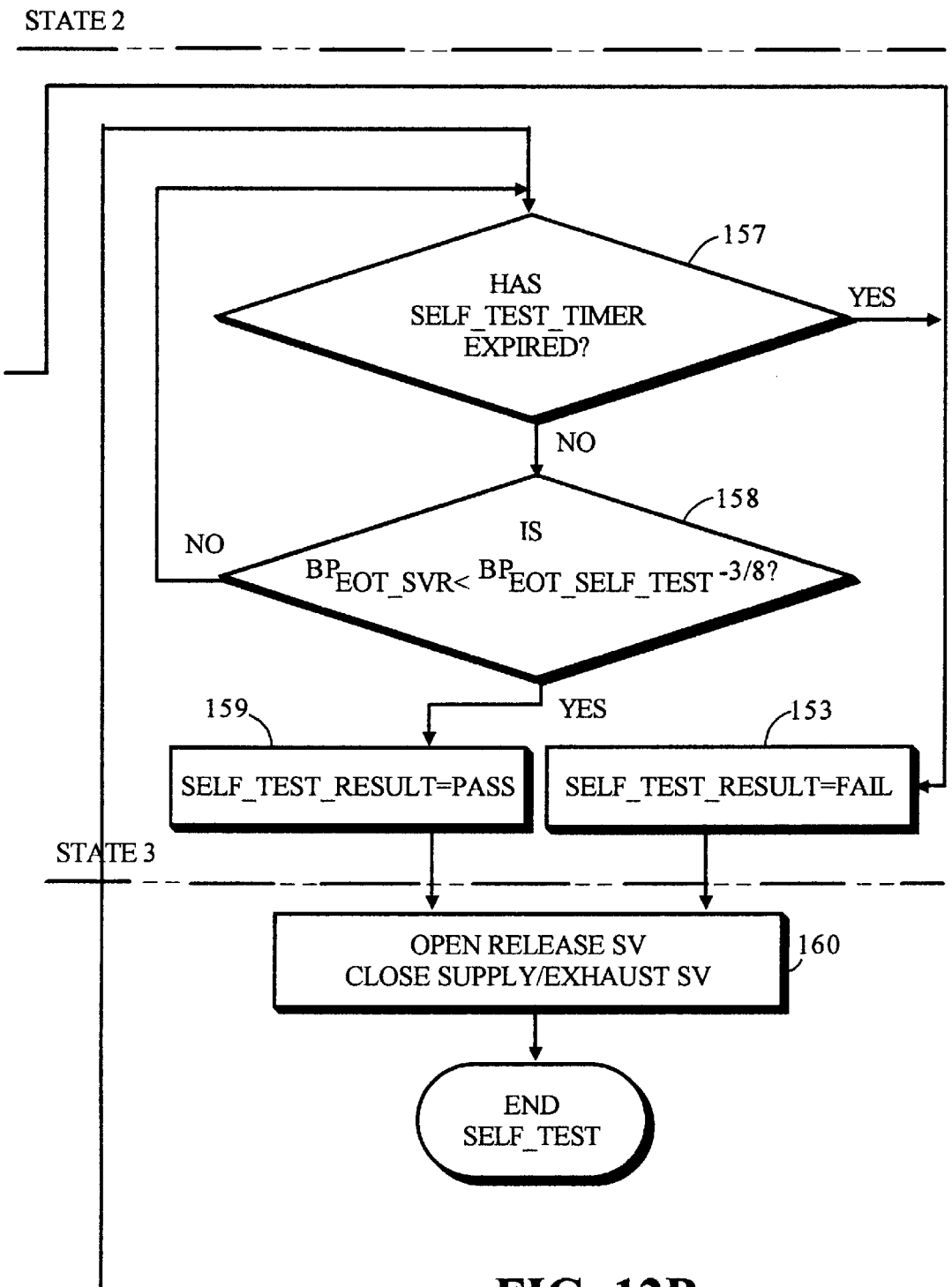

FIG. 12 is a flow diagram of the logic of the software in memory 36 for a EOT unit pneumatic self-test using microprocessor 34. The process of the test is initiated by depressing a test button on the microprocessor, typically when EOT 14 is first installed on a coupler mount (of a car coupler), or performing a self-test initiated by the SIU 48 at other times. Upon initiation of a self-test, the value of the EOT self test brake pipe pressure ($BP_{EOT.SLF\_TST}$) is set equal to the service brake pressure ($BP_{EOT.SVR}$) as seen in function block 151. The release service valve of the brake system is closed and a self-test timer is initialized for about 30 seconds. The initialization phase brings the logic of the software in memory 36 to state 0.

Next, a test is made at decision block 152 to determine if the value $BP_{EOT.SVR}$ is less than $BP_{EOT.SLF\_TST}$ reduced by say three eighths. If so, the result of the self-test is FAIL which is output at block 153. If not, a further test is made in decision block 152. When the self-test timer has timed out, the software of memory 36 is at a state 1.

The next step is to open the release service valve for say ten seconds, as indicated in function block 155. Then, as seen in function block 156, $BP_{EOT.SLF\_TST}$ is set equal to $BP_{EOT.SVR}$, the release service valve is closed, and the supply/exhaust service valve of the brake system is opened. The self-test timer is initialized to say ten seconds, to bring the software of memory 36 to state 2.

A test is then made in decision block 157 to determine if the self-test timer has timed out. If so, the result of the self-test is FAIL which is output to block 153. If not, a further test is made in decision block 158 to determine if $BP_{EOT.SVR}$ is less than $BP_{EOT.SLF\_TST}$ reduced by say three eighths. If not, a return is made to decision block 77. If so, the software of 36 is brought to a state 3.

The result of the software of 36 reaching state 3 is that the self-test result is PASS in block 159. The results of the self-test, whether FAIL in block 153 or PASS in block 159 are displayed on monitor 26 in the locomotive and then, in function block 160 the release service valve is opened and the supply/exhaust service valve is closed. This ends the self-test.

While the invention has been described in terms of a single preferred embodiment, those skilled in the art will recognize that the invention can be practiced with modification within the spirit and scope of the appended claims.

We claim:

1. A locomotive and end of train telemetry apparatus wherein a Locomotive Control Unit includes means for transmitting signals to an End of Train Unit, and the End Train Unit has means for transmitting signals to the Locomotive Control Unit each under the control of a microprocessor located respectively in said Units, the microprocessor in said Locomotive Control Unit being provided with memory that stores brake pipe and equalizing reservoir pressure values occurring over a predetermined period of time as received from an equalization pressure reservoir and from a brake pipe extending continuously from the locomotive through a railway train of cars to a remote car of the train, the apparatus comprising:

a System Interface Unit interfacing the microprocessor of the Locomotive Control Unit with the brake pipe and the equalizing reservoir for providing the microprocessor in the Locomotive Control Unit with said brake pipe and equalizing pressure values, a pressure transducer interfacing the brake pipe with the microprocessor in the End of Train Unit for providing said microprocessor with brake pipe pressure values, and the means for transmitting information between the Locomotive and End of Train Units includes respective radio transceivers electrically connected to the microprocessors located in the Locomotive and End of Train Units.

2. The apparatus of claim 1 wherein the memory of the microprocessor in the Locomotive Control Unit includes software that determines brake pipe pressure stability based upon changes in brake pipe pressure and equalizing reservoir pressure, as received by said microprocessor, occurring within a predetermined time span.

3. The apparatus of claim 1 wherein the End of Train Unit includes a valve pneumatically connected to the brake pipe at the location of said Unit and electrically connected to the microprocessor of said Unit, said valve being effective to control the exhaust of brake pipe pressure at either a service or emergency rate as may be remotely commanded.

4. The apparatus claim 1 wherein the System Interface Unit provided in the locomotive contains an algorithm that synchronizes microprocessor operations in the Locomotive Control and End of Train Units by forwarding time stamps to both of said microprocessors.

5. The apparatus of claim 1 wherein the microprocessors have a setup program that orders an emergency state if brake pipe pressure decreases at a predetermined rate.

6. A computer implemented method for radio-based Electro-Pneumatic (EP) control of railroad train brakes, said method being implemented on microprocessor control circuits of a Locomotive Control Unit (LCU) and an End of Train (EOT) Unit in an end of train system, the method comprising the steps of:

on the occurrence of powering the end of train system, storing brake pipe and equalizing reservoir pressure data for a predetermined time period, said data later being used to determine a rate of change of brake operating pressures, measuring rates of change of operating pressures to determine when equalizing reservoir pressure, brake pipe pressure and brake pipe pressure at the end of the train are stable;

when the equalizing reservoir pressure, the brake pipe pressure and the brake pipe pressure at the end of the train are stable, commanding the EOT unit to update operating pressures stored in its microprocessor control circuit;

detecting a predetermined amount and rate of decrease in brake pipe pressure indicating application of brakes; and transmitting brake commands from the LCU to the EOT Unit in response to detecting said predetermined decrease in brake pipe pressure.

7. The method of claim 6 including:

monitoring brake pipe pressure to detect an emergency condition; and immediately entering an emergency procedure upon detection of the emergency condition even if brake operating pressures have not been established.

8. The method of claim 7 wherein the method is implemented as a state machine on the microprocessor control circuits of the LCU and the EOT Units, the state machine entering a Setup state on the occurrence of power on to establish brake operating pressures and a Release state when operating pressures are established and stable, further comprising the steps of:

detecting when an emergency condition ceases to exist; and exiting from the emergency state to the Setup state or to the Release state if the Setup state is completed.

9. A method of implementing a setup state on a microprocessor located in a Locomotive Control Unit and in anEnd of Train Unit in an end of train system having a brake pipe extending between a locomotive and the last car of a train of cars connected to the locomotive, comprising:

commencing a setup state on the occurrence of powering the end of train system to establish brake pipe pressure and a brake release state when brake pipe pressure is established and stable by determining the magnitude and a rate of change in brake pipe pressure, detecting an emergency condition if the magnitude in brake pipe pressure decreases at a predetermined rate, and completing the setup state if brake pipe pressure increases to a predetermined magnitude after a predetermined period of time.

10. The method of claim 9 further including:

determining pressure magnitude in an equalization reservoir connected to the brake pipe after a predetermined period of time has elapsed to complete the setup state.

11. A method of determining a state of stability in brake pipe pressure values in a train of cars connected to a locomotive, the locomotive and cars having a brake pipe extending from the locomotive to and through the cars to a car remote from the locomotive, comprising:

determining a change in pressure values in a brake pipe at the locomotive and at a car of the train remote from the locomotive, as well as a change in the pressure value of a equalization reservoir connected to the brake pipe, determining if the brake pipe and equalization reservoir pipe pressure values are at or below a predetermined rate of change, in which case a state of stability exists for releasing the brakes of the train, and updating said pressure values using software associated with a microprocessor respectively located in the locomotive and in the car remote from the locomotive, and respectively connected to the brake pipe at the locomotive and in the car remote from the locomotive for receiving pressure values existing in said brake pipe.

12. A method of providing a state of release for the brakes of a train of cars connected to a locomotive, comprising:

determining a rate of change in the magnitude of pressure in a brake pipe extending from the locomotive to and through said cars, providing a state of pressure stability if said rate of change is less than a predetermined value, using said pressure stability to release the brakes of said train, and to thereinafter apply said brakes when needed.

13. A method of qualifying the brakes of a train of railroad cars for minimum brake application, said train having a brake pipe and an equalizing pressure reservoir, the method comprising:

determining pressure and a rate of pressure change in the brake pipe and equalizing pressure reservoir, determining pressure in the equalizing pressure reservoir if the rate of change in brake pipe pressure is less than the predetermined amount over said predetermined period of time, forwarding a minimum brake application command to a car located at an end of the train remote from a lead locomotive connected to the train of cars if the pressure in the equalizing pressure reservoir has increased more than a predetermined amount in a predetermined period of time, and decreasing brake pipe pressure at the remote end of the train upon receipt of the command in the remote car.

14. A method of qualifying service application of the brakes of a train of railroad cars comprising:

measuring a rate of change in the magnitudes of equalization reservoir pressure and brake pipe pressure, and sending service brake commands to an End of Train Unit of railroad cars if there has been a predetermined decrease in equalizing reservoir pressure in a predetermined period of time.

15. The method of claim 14 further including:

monitoring an equalizing reservoir pressure signal provided upon the occurrence of a brake release state to determine if the brakes of the train are released or applied.

16. The method of claim 14 further including:

declaring the equalization reservoir pressure stable if the magnitude of equalizing reservoir pressure decreases less than a predetermined amount within a predetermined period of time and either does not increase in pressure in a predetermined period of time or increases in pressure a minimal amount in a predetermined period of time.

17. The method of claim 16 including the further step of exiting to a Qualify Deeper Service Application state when the equalizing pressure reservoir signal is declared stable.

18. The method of claim 14 further including:

calculating a target brake pipe pressure reduction at the End of Train Unit when said Unit receives a service brake command, and venting brake pipe pressure until said pressure reaches the calculated target pressure.

19. The method claim 14 further including:

forwarding a brake release command to the End of Train Unit when a change in equalizing reservoir pressure indicates a change from brake applied to brake release, and relinquishing control of brake pipe pressure by the End of Train Unit when the brake release command is received by said End of Train Unit.

20. The method of claim 14 further including:

synchronizing the operation of the End of Train Unit with a Locomotive Control Unit using time stamps issued by a System Interface Unit interfacing brake pipe pressure with a microprocessor in the Locomotive Control Unit, forwarding said time stamps to said microprocessor from the System Interface unit, and transmitting said time stamps from said microprocessor to a microprocessor located in the End of Train Unit.

21. A method of effecting a self-test procedure for determining pneumatic conditions at the end of train of railroad cars having an End of Train Unit containing a microprocessor and associated memory, said associated memory containing self-test software, the method comprising:

initiating the self-test procedure by running the software, using said software to provide a self-test pressure value and to set the same to a service brake pressure value, determining if the value of the service brake pressure is less than the self-test pressure value by a predetermined amount, and indicating a FAIL condition if the service brake pressure value is less than the self-test pressure valve by the predetermined amount.

22. The method of claim 21 further including:

starting a self-test timer to run for a predetermined period of time, determining whether or not said timer has timed out if service brake pressure value is not less than the self-test pressure value by said predetermined amount, opening a release service valve for a predetermined period of time when the timer has timed out, setting again the self-test pressure value equal to the service brake pressure value, closing said release service valve, and opening a supply/exhaust service valve.

23. The method of claim 22 further including:

determining again if the service brake pressure valve is less than said self-test pressure value by a predetermined amount, and indicating a PASS condition if the service brake pressure value is not less than the self-test pressure value by said predetermined amount.

24. The method of claim 21 further including:

using a System Interface Unit connecting a brake pipe and an equalizing pressure reservoir to a Locomotive Control Unit to order the self-testing procedure for the end of the train having the End of Train Unit.

25. A method of making minimum incremental reductions in brake pipe pressure at an End-of-train Unit in proportion to a decrease in pressure in an equalizing pressure reservoir connected to a brake pipe at the locomotive end of the train, which pipe extends to the End-of-train Unit, the method comprising:

sending electronic instructions from the locomotive end of the train to the End-of-Train Unit concerning the reduction in reservoir pressure before a reduction in brake pipe pressure takes place at the locomotive end of the train and propagates to the End-of-Train Unit from the locomotive end, and reducing brake pipe pressure at the locomotive end of the train based on the reduction in reservoir pressure.

26. The method of claim 25 including:

synchronizing the reductions in brake pipe pressure at the locomotive end and at the End-of-Train Unit by providing the locomotive and End-of-Train Unit with timers that time stamp incremental brake commands generated at the locomotive end and at the End-of-Train Unit.

27. The method of claim 25 including:

using a Service Interface Unit connecting the brake pipe to a microprocessor in the locomotive to synchronize the brake pipe reductions in pressure at the locomotive end and at the End-of-Train Unit.

28. The method of claim 27 including:

using said Interface Unit to update operating pressures in the reservoir and brake pipe, and synchronizing brake pipe reduction in pressure when said operating pressures are updated.

29. The method of claim 28 including:

sending a synchronized command to the End-of-Train Unit from the Interface Unit, and using the End-of-Train Unit to synchronize itself to said command.

30. The method of claim 25 including:

determining if a minimum brake application command has previously been received by the End-of-Train Unit when said Unit receives a current minimum brake application command, and refusing to perform the current brake application if a previous minimum brake application in the End-of-Train-Unit has been received by the End-of-Train-Unit.

31. The method of claim 30 wherein the End-of-Train Unit looks for the value of brake pipe pressure at the time the minimum brake application command was generated if a previous minimum brake application has not been received by the End-of-Train Unit, and refuses to make the minimum brake application of the command if current brake pipe pressure is greater than or equal to a predetermined amount below the brake pipe pressure at the time the command was generated.

32. The method of claim 31 wherein the end-of-train unit performs the minimum brake application if a previous brake application has not been received, and if current brake pipe pressure is not greater than or equal to said predetermined amount below the brake pipe pressure when the command was generated.

* * * * *